June 15, 1965  R. R. HAGER  3,188,920
BRAKE SERVOMOTOR MEANS
Filed April 1, 1963  4 Sheets-Sheet 1

INVENTOR.
ROBERT R. HAGER
BY
Richard G. Geil
ATTORNEY

June 15, 1965  R. R. HAGER  3,188,920
BRAKE SERVOMOTOR MEANS
Filed April 1, 1963  4 Sheets-Sheet 3

INVENTOR.
ROBERT R. HAGER
BY
Richard G. Geib
ATTORNEY

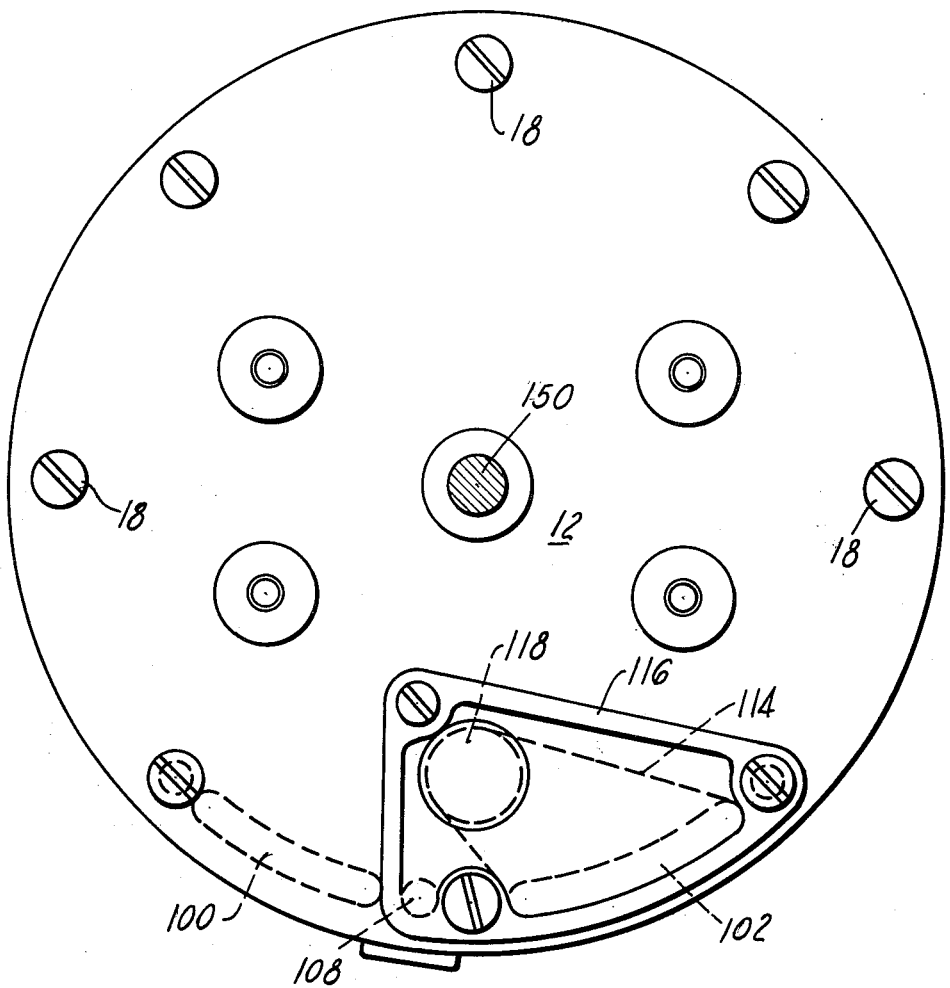

United States Patent Office 3,188,920
Patented June 15, 1965

3,188,920
BRAKE SERVOMOTOR MEANS
Robert R. Hager, South Bend, Ind., assignor to The Bendix Corporation, South Bend, Ind., a corporation of Delaware
Filed Apr. 1, 1963, Ser. No. 269,240
4 Claims. (Cl. 91—391)

This invention relates to a power braking mechanism and, more particularly, to a pneumatic power brake device having means to sense stroking distance to accord an operator with a sense of brake system condition.

In power brake systems as applied to vehicles, it has usually been the intent of designers to reduce the stroke necessary for a brake pedal while at the same time providing "feel" or awareness of brake application. Such designs center about servomotors having means to magnify braking force with a pressure responsive member whose travel is only limited by the servomotor chamber dimensions. The operator will feel the effect of braking, but will not have any way of knowing how much travel is necessary to operate the vehicle's brake shoes unless power has failed and manual control has taken over. Under such situations of power failure dire consequences have arisen because of worn brake shoes. It is, therefore, the principal intent of my invention to provide an indication under power conditions that would forewarn a vehicle operator of worn brake shoes and the like which cause excessive travel of brake applicators.

In more detail, it is an object of my invention to increase the stroke of a brake pedal when the brake shoes have worn beyond reasonable limits by sensing the travel of a servomotor controlled device building up braking pressure.

Another object of my invention is to sense the position of a pressure responsive member in a servomotor to control the holding of a manually operable element in an extended position or to allow telescoping of the element within the servomotor when the member has an abnormal travel.

Other objects and advantages will become readily apparent to those skilled in the art to which this invention relates from the following description of the accompanying drawings in which:

FIGURE 4 is an end view of my servomotor showing passage location within the housing.

Figure 1:
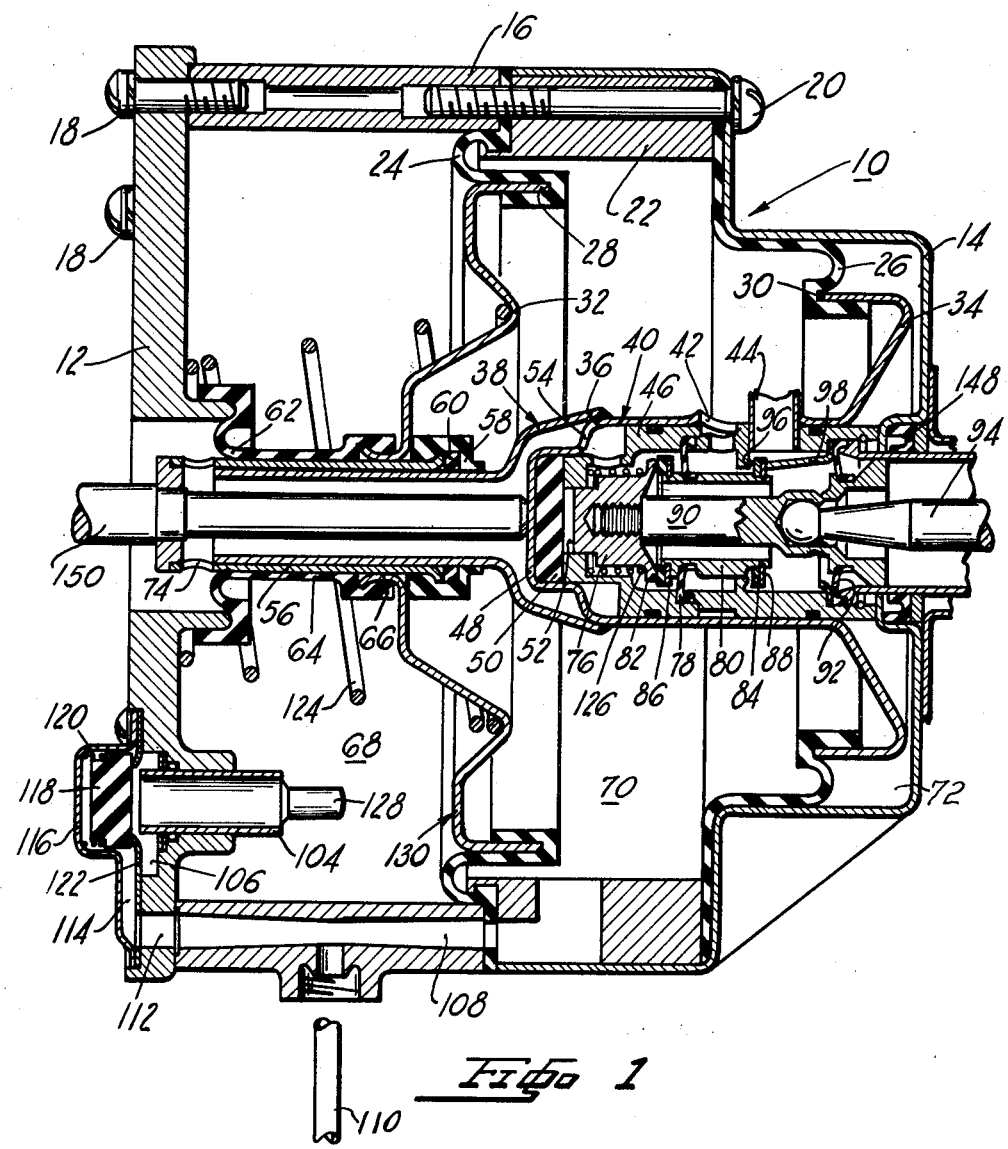
FIGURE 1 is a sectional side view of a servomotor constructed in accordance with the principles of my invention showing the power section in a rest or non-actuated condition.

In more detail and with reference first to FIGURE 1, I show a servomotor 10 having a housing consisting of a front end wall 12, a rear end wall 14, and an intermediate section 16 all of which are joined together by bolts 18 and 20 and a spacer 22. The spacer 22 is adapted to sealingly hold a pair of diaphragms 24 and 26 against the intermediate section and the rear end wall 14, respectively.

The diaphragms 24 and 26 are provided with slots which are of a depth and cross-section to form an interference fit with in-turned flanges 28 and 30 of a pair of movable walls 32 and 34, respectively. These movable walls are sealingly connected to a valve housing 36 as will be explained hereinafter in greater detail.

As seen in FIGURE 1, the valve housing is constructed of two tubular portions 38 and 40 which are welded together and for purposes of description, termed front and rear portions, respectively. The rear portion 40 is provided with a side opening 42 and a hose connection port 44, and a valve body 46 is buttressed against a forward end wall 48 of the rear portion 40 with a rubber disc 50 interposed. Adjacent the disc, the valve body is provided with an opening 52 whose diameter may vary in accordance with reaction requirements of the power brake system. The end wall 48 is provided with an opening 54 to communicate the interior of portion 40 with the interior of portion 38. In addition, as seen, the rear portion is formed with radiating portions opposite the end wall 48 which terminate in the in-turned flanges 30 sealingly gripped by the diaphragm 26.

The portion 38 is closed forwardly by a sleeve end closure 56 which sleeve is joined to portion 38 by a resilient collar 58 and retainer ring 60. A seal 62 having a tubular extension 64 adapted to have a rolling interference fit with sleeve 56 provides an operative connection through the front end wall 12. The tubular extension is also adapted to receive an annular flange 66 of the movable wall 32 to apportion the servomotor into a front chamber 68 and a rear chamber 70. The sleeve end closure is provided with radial drilled passages 74 to open the interior of portion 38 to a low pressure source or atmosphere exterior of the servomotor 10 depending on how one is to utilize my invention.

The valve body 46 slidably mounts a valve poppet seat member 76 in opening 52, and by a diaphragm 78 a poppet sleeve 80 carrying a front valve face 82 and a rear valve face 84 bonded to washer members 86 and 88 which are held on the sleeve as by riveting, press fitting, etc. A control member 90 is affixed to member 76 as by screwing, pinning, etc., and movably mounted at its opposite end with respect to the body 46 by a diaphragm 92. This control member mounts a control rod 94 by a ball-joint connection, as shown, which control rod is operatively connected to a brake pedal (not shown) within a vehicle. The valve body 46 is formed with a rearwardly facing valve seat 96 and a valve stop member 98 to limit the rearward travel of the valve sleeve 80.

Figure 2:
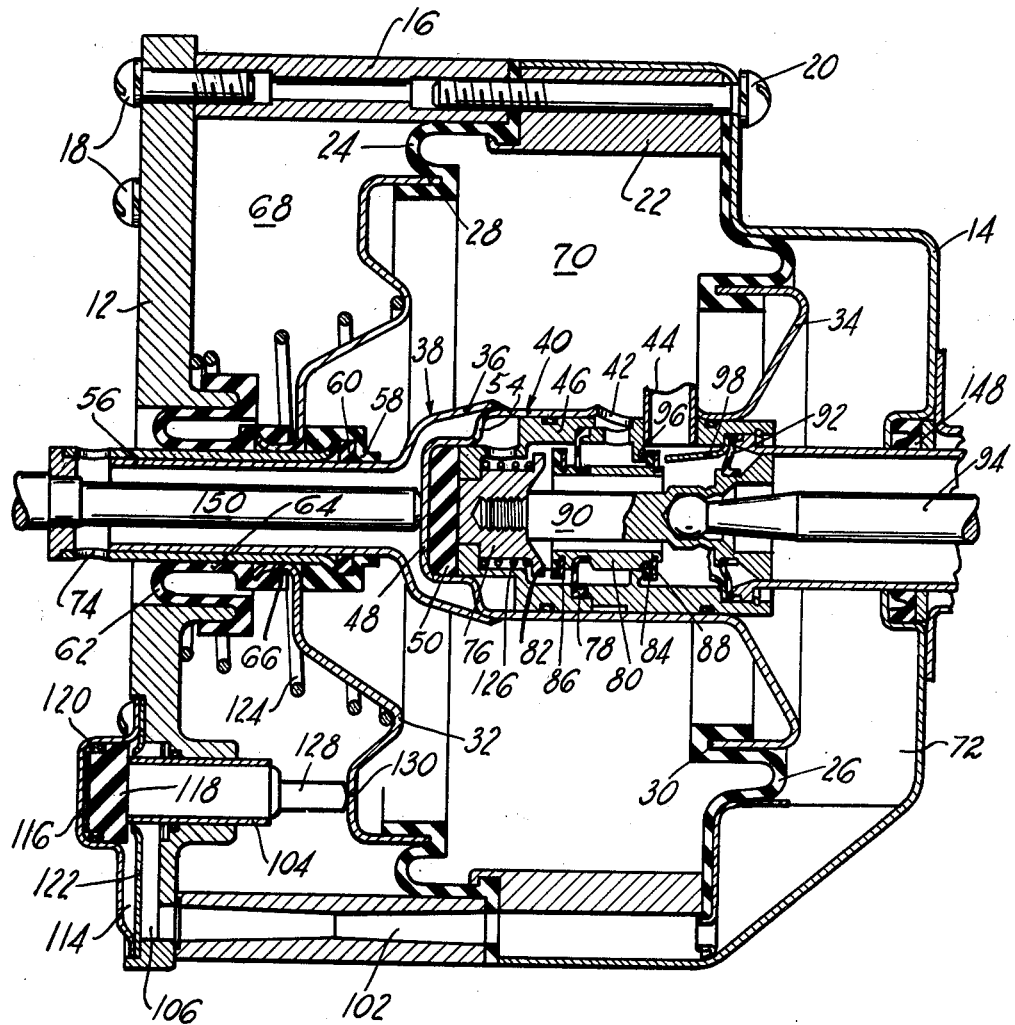
FIGURE 2 is another sectional side view of the servomotor showing the power section energized such that the control rod is telescoped within the servomotor indicating an abnormal travel of the power section has occurred.
Figure 3:
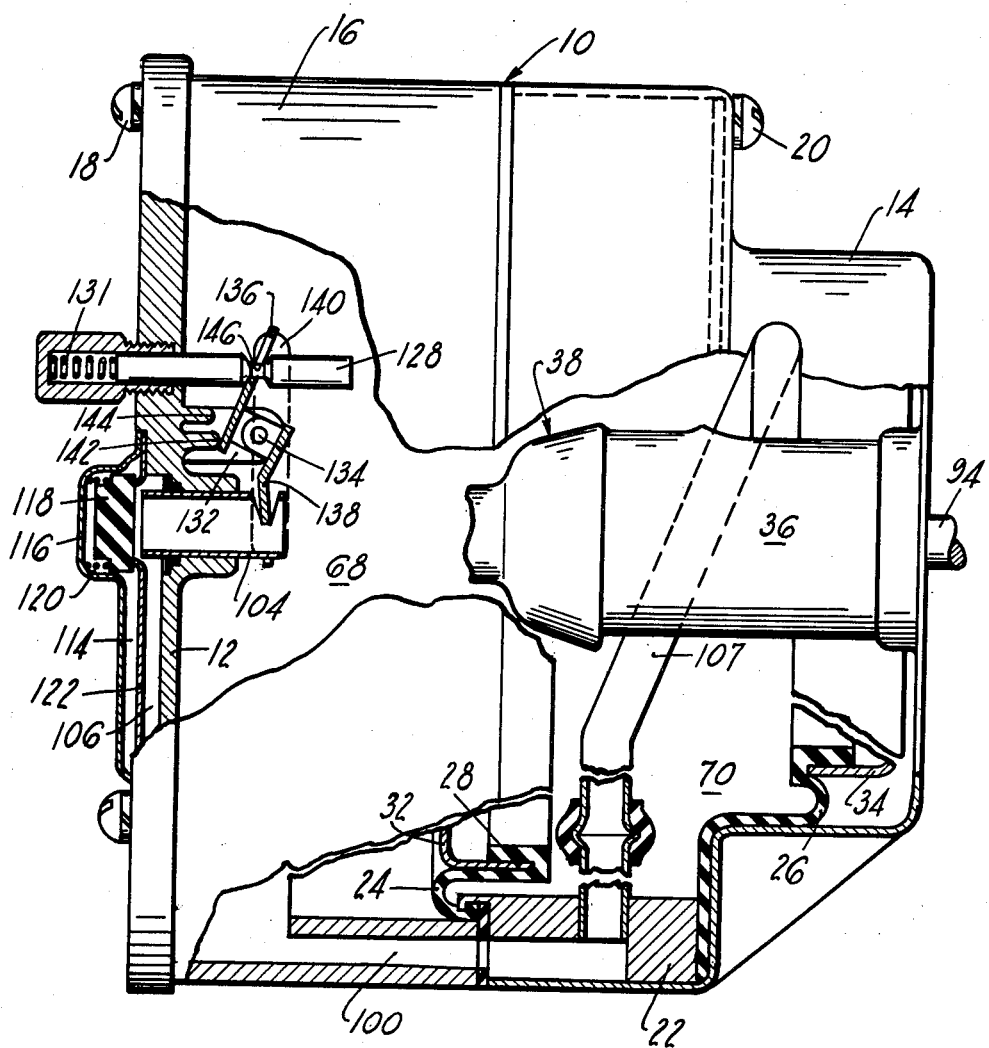
FIGURE 3 is a broken plan view of my servomotor presenting details of a valve actuation means for controlling the holding or telescoping of a manually operable control member.

In the non-energized position, as shown by FIGURE 1, the valve sleeve 80 allows communication of chamber 70 with chambers 68 and 72 by way of passages 100 and 102 (see FIGURES 2 and 3) in the intermediate section 16 and spacer 22, which chambers are in flow communication by way of a tubular member 104 and a cavity 106 in front end wall 12 and a hose connection 107 (see FIGURES 1, 2 and 3). The intermediate section and spacer is provided with another passage 108 (see FIGURE 1) which is connected to a high pressure source by way of a conduit 110 via port 112, which high pressure source may be atmosphere or compressed air depending on how the connection to the openings 74, as above-mentioned. The passage 108 opens into chamber 70 at one end and to an opening 112 through end wall 12 at the other end, which opening 112 leads to a control chamber 114 formed exteriorly of front end wall 12 by a cover 116 over the cavity 106. A valve plug 118 is biased by a spring 120 to seat on a plate 122 to control communication of chamber 114 and cavity 106. The tubular member 104 is slidably mounted in the wall 12 and arranged to cooperate with the plug 118 to lift the plug from the plate 122 under conditions hereinafter explained.

Before proceeding to a description of the operation it should be noted that I provide a spring 124 between the end wall 12 and the movable wall 32 to bias the latter rearwardly. In addition, by the use of diaphragms 78 and 92 I have eliminated the need for several seals and a heavy return spring. In other words I provide a fluid pressure means for biasing the valve mechanism to its normal non-operative position as seen in FIGURE 1. More particularly, the area of diaphragm 78 exposed to high pressure fluid plus the frontal area of valve face 82 exposed to the same fluid is less than the area of diaphragm 92 subjected to the same pressure. This relationship of pressure biasing the valve structure to the rear is maintained throughout valve operation. As may be realized by those skilled in the art the use of diaphragms reduces friction and hysteresis of valve operation normally attributable to sliding seals. It is also suggested that an internal spring 126 be incorporated between the valve body 46 and the seat member 76.

By way of reference to FIGURE 3, my mechanism for actuating the tubular member 104 is shown comprising a trigger 128 arranged to cooperate with an abutment portion 130 of the movable wall 32. As seen, the trigger is slidably mounted through the wall 12 and biased by a spring 131 to project into chamber 68. I have also formed the end wall 12 with a lug 132 which rotatably supports a shaft 134 to which I have rotatably affixed a lever 136 and fixedly mounted a lever 138. The levers are normally positioned such that their terminal ends, as projected from said shaft, lie in the same plane, and a spring 140 connects these terminal ends. The wall 12 is also provided with stops 142 and 144 to limit travel of lever 136. The trigger 128 is necked, as at 146, with beveled faces cooperating with a bearing face on lever 136.

In operation, air pressure is supplied directly to the passage 108 leading to chambers 70 and 114 (see FIGURE 1). From chamber 70 the pressurized fluid or atmospheric air, as the case may be, passes into the valve housing 36 via opening 42 and between the seat 96 and ring 84 to port 44 thence through tube or hose connection 107 (see FIGURE 3) to passage 100 leading to chamber 68. From the chamber 68 the fluid passes through tube 104 to cavity 106 and passage 102 (see FIGURE 2) to chamber 72.

As seen, a seal 148 for the rear wall 14 and the seal 58 on the tube section 38 are of a different size such that the net effect of similar pressures acting thereat is to bias the valve housing and wall 34 to abut the wall 14, as seen in FIGURE 1.

Force applied to control rod 94 closes ring 84 on seat 96 and opens the exhaust poppet member 76 to allow fluid pressure in chambers 68 and 72 to exit or be drawn from port or opening 74 by the way of opening 54. This creates a pressure differential across the diaphragms 24 and 26 to move wall 32 forwardly and hold wall 34 rearwardly which will project a force transmitting rod 150 from within my servomotor. The rod 150 may for purposes of illustration be attached to a master cylinder piston, as may be readily understood by those skilled in the art. The force transmitting rod and master cylinder connection may be as shown by a copending U.S. application Serial No. 64,459, now Patent No. 3,080,768 assigned to the common assignee wherein the force transmitting rod forms a support member for the servomotor valve structure.

In any event, the pressure differential across wall 32 is the force stroking and displacing fluid from a master cylinder; whereas, the pressure differential across the rear wall 34 will cause portion 40 to compress disc 50 and extrude it into opening 52 to react on member 76 to provide feel to rod 94. However, this reaction force is also applied through body 46 to the rear wall 14 to split the force and obtain not the total feel but a desired feel which can be increased or decreased by respectively increasing or decreasing the size of opening 52. As may be readily expected the diaphragm area 26 can be varied to provide feel, but to make a more economical unit I utilize a disc reaction.

As mentioned above, the valve is constructed with diaphragms used for sealing and balancing to minimize hysteresis due to friction and to bias the valve elements in place of one of the many springs used in prior art units. Thus, the return stop 98 for the valve structure is applied to the sleeve 80 on retainer ring 88 and the return spring 126 to the member 76 to establish the original bias on the sleeve so that enough differential can be developed on the biasing diaphragms to cause the valve to work. Otherwise a restriction would have to be designed in the unit so that supply air pressure of whatever type used could be built up fast enough to create a bias to cause the valve to seal. Such restrictions tend to slow response of units of this type and therefore are not desirable.

In the event that adequate braking of the associated vehicle requires the wall 32 to stroke until it contacts trigger 128 (see FIGURE 2) and forces this trigger forwardly against the spring 131, it will cause lever 136 to revolve to stretch spring 140. This places a maximum tensile load on the spring which is relieved by snapping lever 138 to force tube 104 inwardly removing plug 118 from plate 122. The stop 144 limits the stroke of trigger 128 to preclude spring 140 from opposing spring 131 preventing return of trigger 128 when brakes are released. When plug 118 moves off plate 122 cavity 106 and chamber 114 are in communication and chambers 70 and 72 are equally pressurized to create a zero pressure differential across wall 34. With the absence of any pressure differential the valve housing will now follow-up the front diaphragm and the operator feels this action as stroke on the pedal connected to rod 94. The spring 131 re-trips the trigger 128 when force on rod 94 is released and wall 32 is returned by spring 124. Instead of having spring 131 for automatic return, one could merely have a free trigger requiring manual resetting.

As other constructions may embody the inventive features I have disclosed, I do not propose to be limited by the above description but rather by the appended claims which set forth the true scope of my invention.

I claim:

1. In a pressure suspended servomotor including a control rod and a force transmitting rod, a mechanism indicating abnormal travel of said force transmitting rod, which mechanism comprises:

a housing having a pressure inlet with a first fluid passage connected thereto, a second fluid passage therein, a third fluid passage therein, said first and second passages extending through one end of the housing, and axially aligned openings in said housing adapted to sealingly receive, at respective ends, said control rod and said force transmitting rod;

a first movable wall in said housing dividing said housing into a first variable volume chamber and a second variable volume chamber having flow communication with said first and second fluid passages, respectively;

a second movable wall in said second variable volume chamber dividing a third variable volume chamber from said second chamber such that said second chamber is connected to said first fluid passage and said third chamber is in flow communication with said second passage;

a valve housing operatively connected to said first and second movable walls, said valve housing having an axial passage leading to a low pressure port at one end, a radial passage communicating said second chamber to the interior of said valve housing and an outlet port in said housing;

a means for communicating said valve housing outlet port to said third fluid passage which third passage is open to said first chamber;

a valve operatively mounted in said valve housing, which valve is adapted to be controlled by said control rod to open and close communication between said radial passage and said low pressure port via said axial passage and between said radial passage and said outlet port, whereby said first chamber is communicated to a low pressure and to a pressure in said second chamber, respectively;

a means sensing the travel of said first movable wall attached to an end wall of said housing, said means adapted to control flow communication between said first, second and third fluid passages.

2. For a pressure suspended operable element and a driven element operatively connected in a servomotor, a device to sense travel of said driven element in excess of a predetermined distance, said device comprising:

a housing having a chamber therein with a front and a rear end wall joined by an intermediate section, said section having three passages therein first of which registers with a passage through said front end wall, a second of which registers with an inwardly directed passage in said front end wall leading to a bore through said front wall with a third passage having a port adjacent said front end wall and another port intermediate said chamber, said front and rear walls having additional axial, aligned openings;

a means to separate said chamber into intermediate, rear and front variable volume chambers each of which is communicated respectively to said first passage, said second passage and said third passage in said intermediate section;

a valve housing sealingly mounted in said axial, aligned openings, and operatively connected to said means to separate said chamber into front, rear and intermediate variable volume chambers, said valve housing having an axial passage, a control pressure port communicating said intermediate variable volume chamber to said axial passage, a passage port connecting said axial passage with said intermediate port of said passage of said intermediate section opening into the chamber adjacent said front wall, and a low pressure port communicating said axial passage with a low pressure source;

a valve means controlling communication of said passages of said intermediate section; and a tubular means mounted through said front end wall, said tubular means sensing the distance said driven element travels, and adapted to control said second valve to close communication of said front and rear chambers and open communication between said intermediate and rear chambers whereby said manually operable element is drawn into said servomotor to provide an indication to an operator of an abnormal condition.

3. For a pressure suspended servomotor including a manually operable element controlling a valve means to operate a pressure responsive member, which member is operatively connected to a force transmitting means, which means is also operatively connected to said manually operable element, a pressure responsive device to indicate abnormal travel of the force transmitting means, which device comprises:

a movable wall operatively connected to both the manually operable element and the force transmitting means;

first passage means within said servomotor to convey a high pressure to one side of said movable wall;

a second passage means within said servomotor to convey a low pressure to the other side of said movable wall, whereby a pressure differential across said wall is created to bias the manually operable element to a rear position; and a valve means operatively connected to the servomotor, which means is responsive to extreme stroking of said servomotor and arranged to create equal pressure on said movable wall through said first passage means and said second passage means to decrease said pressure differential to draw the manually operable element inwardly of said rear position whereupon an operator is made aware of the abnormal stroking.

4. In a power braking system for vehicle brakes, a servomotor comprising:

a housing comprised of a front end wall, a rear end wall and an intermediate section joined together to form a power chamber in which a pressure responsive element is operatively mounted, said servomotor additionally including a manually operable element and a driven element operatively slidably mounted by said rear end wall and said front end wall respectively, said driven element being connected to both said pressure responsive element and said manually operable element;

a valve means operatively connected to said manually operable element, said valve means normally providing equal pressure to each side of said pressure responsive element and having provision to, at the urging of said manually operable element, reduce pressure on said pressure responsive element on the side facing said front end wall to project said driven element;

a cavity in said rear end wall open to the area of said servomotor behind said pressure responsive element;

a movable wall in said cavity dividing it into a front and a rear variable volume chamber, said wall being operatively connected to said manually operable element;

passage means in said servomotor providing flow communication of the area adjacent said front end wall with the rear chamber such that said movable wall is normally biased by pressure in said area behind said movable wall to hold said manually operable element in its extended position; and means to control said passage means in accordance with the stroking of said servomotor to close off said communication with said area adjacent said front end wall and open communication between said area adjacent said rear end wall and said rear chamber whereupon pressure on said manually operable element is no longer resisted and said element is allowed to telescope inside said servomotor to provide an indication of said stroking.

References Cited by the Examiner
UNITED STATES PATENTS

| | | | |
|---|---|---|---|
| 2,852,757 | 9/58 | Fawick | 188—1 |
| 3,074,383 | 1/63 | Shultz | 91—391 |
| 3,076,441 | 2/63 | Ayers | 91—391 |
| 3,093,119 | 6/63 | Stelzer | 91—391 |

FRED E. ENGELTHALER, *Primary Examiner.*

SAMUEL LEVINE, *Examiner.*